July 14, 1931.    E. J. MURPHY    1,814,842
INDICATOR SYSTEM
Filed June 8, 1927
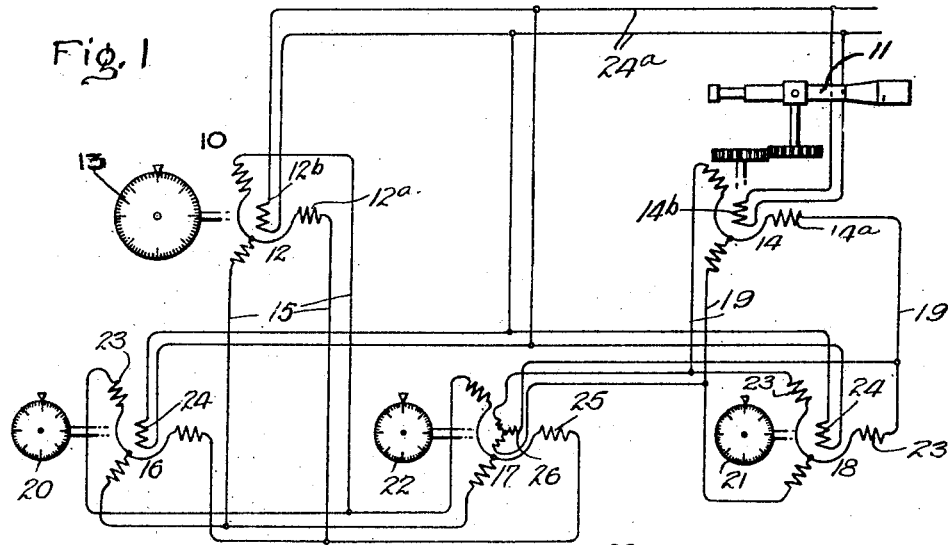
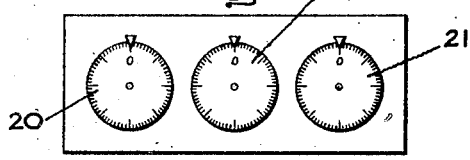
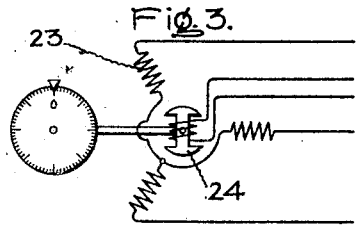
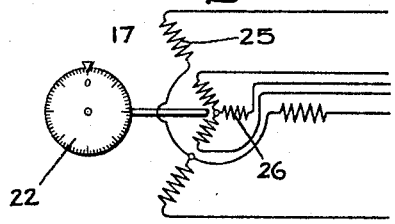
Inventor:
Edwin J. Murphy,
by
His Attorney.

Patented July 14, 1931

1,814,842

UNITED STATES PATENT OFFICE

EDWIN J. MURPHY, OF SCHENECTADY, NEW YORK, ASSIGNOR TO GENERAL ELECTRIC COMPANY, A CORPORATION OF NEW YORK

INDICATOR SYSTEM

Application filed June 8, 1927. Serial No. 197,502.

My invention relates to indicator systems, more particularly to indicator systems such as used on ship board in the control of guns, and has for its object the provision of a simple and reliable system for indicating bearings.

More specifically my invention relates to bearing indicator systems such as used, for example, in gun fire control on warships wherein the bearings of the target and of the ship are transmitted to a central control station. In one of its aspects my invention relates to an indicator system for transmitting to this control station the compass bearing of the ship, and the bearing of the target with the relation to the ship, together with means for indicating the compass bearing of the target.

In carrying out my invention I provide a gyrocompass with a suitable motion transmission system associated therewith for transmitting its movements with relation to the ship to a central control station, a sighting device together with means for transmitting its movements to the central station, and electrical instruments in the central station responsive to the transmitted indications.

For a more complete understanding of my invention reference should be had to the accompanying drawings in which Fig. 1 is a diagrammatic representation of an indicator system embodying my invention; Fig. 2 is an enlarged view of a typical indicator in the control station; while Figs. 3 and 4 are diagrammatic representations of the receiver motors for operating the indicators.

Referring to the drawings, in carrying out my invention in one form I provide a suitable gyrocompass 10 and a sighting device shown as a telescope 11. These devices, it will be understood, are mounted in suitable positions on the battleship. The gyrocompass will ordinarily be located below deck, while the telescope 11 will be located aloft in one of the look-out stations.

Associated with the gyrocompass is a suitable electrical instrument 12 for transmitting angular motion. This instrument is connected to the gyrocompass card or dial 13 so as to be driven thereby. Although the compass dial 13 apparently turns with relation to the ship, it will be understood that the compass dial is in reality held in a fixed angular position in a horizontal plane by the gyrocompass so that the repeater motor 12 is driven by the swinging movement of the ship with relation to the dial. The gyrocompass with its transmitter 12 constitutes a compass bearing transmitter. In a similar manner an electrical motion transmitting instrument 14 is connected to the telescope so as to be driven thereby. The telescope with its transmitter 14 constitutes a compass bearing transmitter. As shown the instruments 12 and 14 are connected so as to be driven in 1:1 speed ratio by the movements of the dial and telescope respectively with relation to the ship.

The motion transmitting instrument 12 is electrically connected through suitable conductors 15, to the receiving instruments 16 and 17 in the central station. The transmitting instrument 14 is connected to a receiving instrument 18 through the conductors 19 and also to the receiving instrument 17. The receiving instruments 16 and 18 have their rotors connected to dials 20 and 21 respectively and drive these dials to indicate the bearing of the compass dial and of the telescope, respectively, both with relation to the fore and aft line of the ship. The instrument 17 drives a dial 22 in such manner that the movement of the dial 22 is a differential of the movements of the compass dial 10 and the telescope with relation to central line of the ship, and consequently the dial 22 shows the compass or true bearing of the target.

Preferably, alternating current motion transmitting systems are used, as shown for example in Patent No. 1,612,119 to Hewlett and Willard dated December 28, 1926. The instruments 12 and 14 are provided with three-circuit windings 12a and 14a which are similar to a three-phase Y connected armature winding and with single circuit field windings 12b and 14b, the field windings being mounted on the rotors. The receiving instruments 16 and 18 are similar in construction to the transmitting devices, as shown in Fig. 3, each being provided with a three-circuit Y connected armature winding 23 and with a field winding 24. As shown in Fig. 1 the armature windings of the transmitter 12 and the receiver 16 are interconnected, as are also the armature windings of the transmitter 14 and the receiver 18. The field windings are energized from a source of alternating current 24a.

As indicated in Fig. 4, the instrument 17 is provided with two inductively cooperating three-circuit armature windings 25 and 26, each being similar to a three-phase Y connected armature winding. The winding 26 is mounted on the rotor member of the instrument. One of these armature windings is connected to the armature winding of the transmitter 12, while the other is connected to the armature winding of the transmitter 14, these connections being such that when the telescope is moved in the same direction as the compass dial, the dial 22 moves toward its zero position. The dial 22, therefore, shows the compass bearing of the target at which the telescope is pointing.

It will be understood that rotation of the transmitters 12 and 14 causes a similar rotation to be applied to the fields set up by the armature windings in the receivers to which they are connected. In connection with the receivers 16 and 18, the field of the armature winding 23 will rotate with the object controlling it, either the gyrocompass or the telescope as the case may be, and the rotor 24 will follow the rotation of the field of its armature winding due to the reaction between that field and its own field. In connection with the receiver 17, shown in Fig. 4, the gyrocompass controls the angular position of one field, for example, the field of the winding 25 whereby upon movement of the gyrocompass dial 13 the rotor winding 26 is turned by a like amount. The angular position of the field of the winding 26 is controlled by the telescope so that upon movement of the telescope in the same direction as the apparent movement of the compass card 13, the dial 22 tends to return to its zero position. The result is that the dial 22 shows the compass bearing of the ship minus the relative bearing of the target, which is the compass bearing of the target. It will be understood that both bearings are referred to a common arbitrary line, such as the fore and aft line of the ship, and consequently, the difference between the two is the compass bearing of the target, i. e., the compass bearing of the line of sight of the telescope when pointing at the target.

If desired a relay transmitter including a servo motor may be used to drive the transmitter 12 so as to relieve the gyrocompass of the load. Such a relay transmitter system is disclosed for example in Patent 1,626,123 to Sperry dated April 26, 1927.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:

1. A target bearing indicator system for ships comprising a gyrocompass mounted on said ship, transmitting means driven by said gyrocompass for transmitting the compass bearing of the ship, an indicator member responsive to said transmitter means for indicating the compass bearing of the ship, a sighting device on said ship, means for transmitting the bearing of said sighting device with relation to said ship, an indicator member responsive to the latter of said transmitting means for indicating the bearing of said sighting device with relation to said ship, and an indicator actuated jointly by said transmitting means so as to indicate the compass bearing of the target, said indicating members being arranged in close alignment whereby the bearings may be readily compared.

2. A target bearing indicator system for warships, comprising a gyrocompass, an electrical inductive transmitting device driven by said gyrocompass for transmitting the compass bearing of the ship, a sighting device on said ship, an electrical inductive transmitting device driven by said sighting device for transmitting the bearing of said sighting device with relation to said ship, a pair of electrical inductive receiving devices responsive to said transmitting devices respectively for indicating the compass bearing of the ship and the bearing of said sighting device with respect to said ship and an electrical inductive receiving device responsive to said transmitting devices for indicating the compass bearing of said target.

3. A target bearing indicator system for ships comprising a gyrocompass on said ship, an electrical inductive transmitting device having a polycircuit armature winding and a single circuit field winding driven by said gyrocompass for transmitting the compass bearing of said ship, an electrical inductive receiving device having a polycircuit armature winding and a single circuit field winding, electrical connections between the armature windings of said transmitting and receiving devices whereby the compass bearing of the ship is indicated by said receiving device responsive to said transmitting device, a sighting device on said ship, an electrical inductive transmitting device having a polycircuit armature winding and a single circuit field winding driven by said sighting device for transmitting the bearing of said sighting device with relation to said ship, an electrical inductive receiving device having a polycircuit armature winding and a single circuit field winding, electrical connections between the armature windings of said transmitting and receiving devices whereby the bearing of said sighting device with respect to said ship is indicated by said receiving device responsive to said transmitting device, a receiving device having inductively cooperating relatively movable polycircuit armature windings, and electrical connections between the polycircuit armature windings of said receiving device and the polycircuit windings of said transmitting devices respectively whereby magnetic fields are produced in the windings of said receiving device, said fields varying in accordance with the angular position of said compass and sighting devices whereby the compass bearing of the target is indicated.

4. A target bearing indicator system for warships comprising a gyrocompass, means driven by said compass for transmitting the compass bearing of the ship, means comprising a dial responsive to said compass driven transmitting means for indicating the compass bearing of the ship, a sighting device on said ship, transmitting means driven by said sighting device, means comprising a second dial responsive to the latter transmitting means for indicating the bearing of said sighting device with respect to said ship, and means comprising a third dial responsive to said transmitted bearings for indicating the compass bearing of said sighting device, the dials of said indicating means being arranged in adjacent relation.

In witness whereof, I have hereunto set my hand this 7th day of June, 1927.

EDWIN J. MURPHY.